United States Patent Office 3,533,565
Patented Oct. 13, 1970

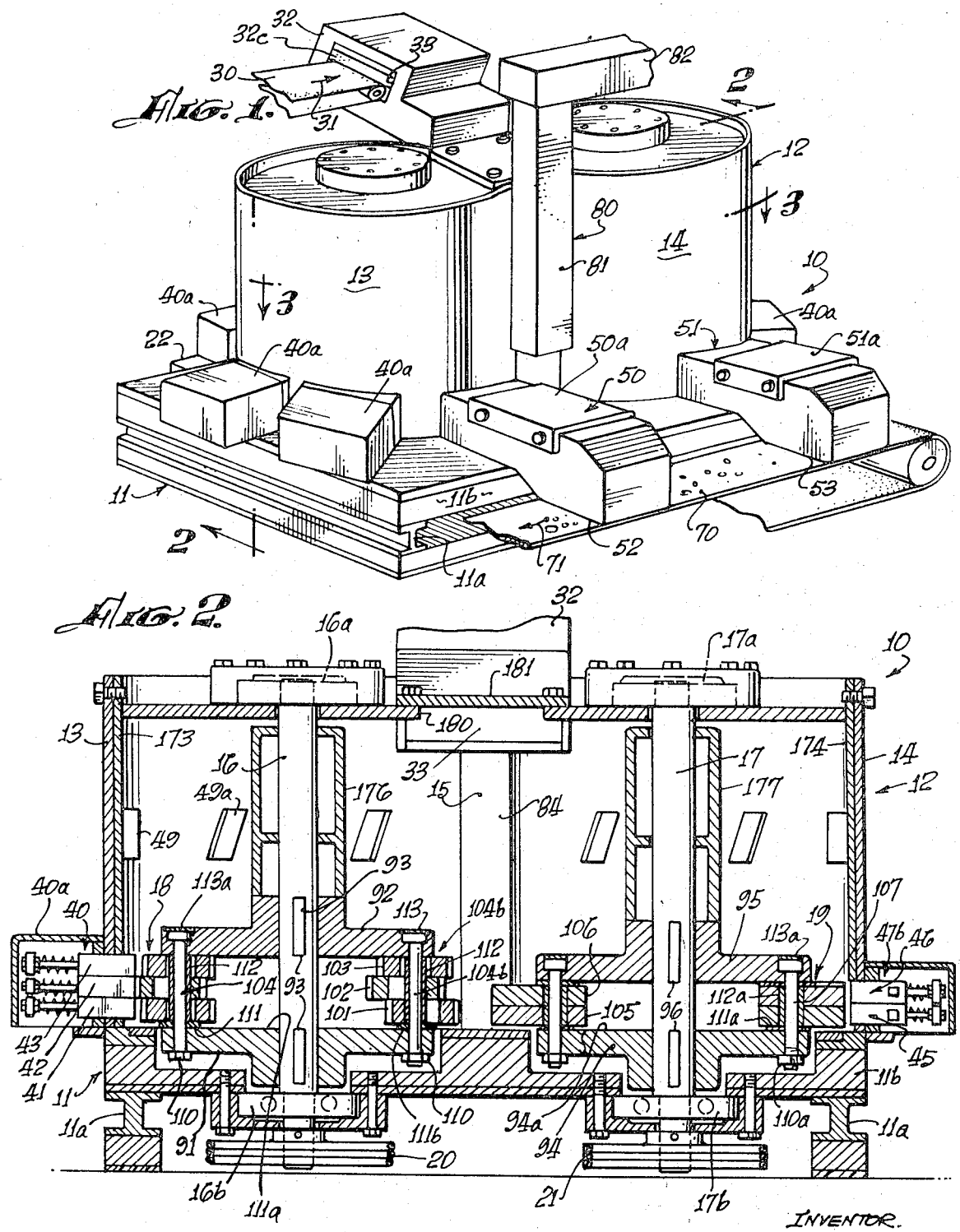

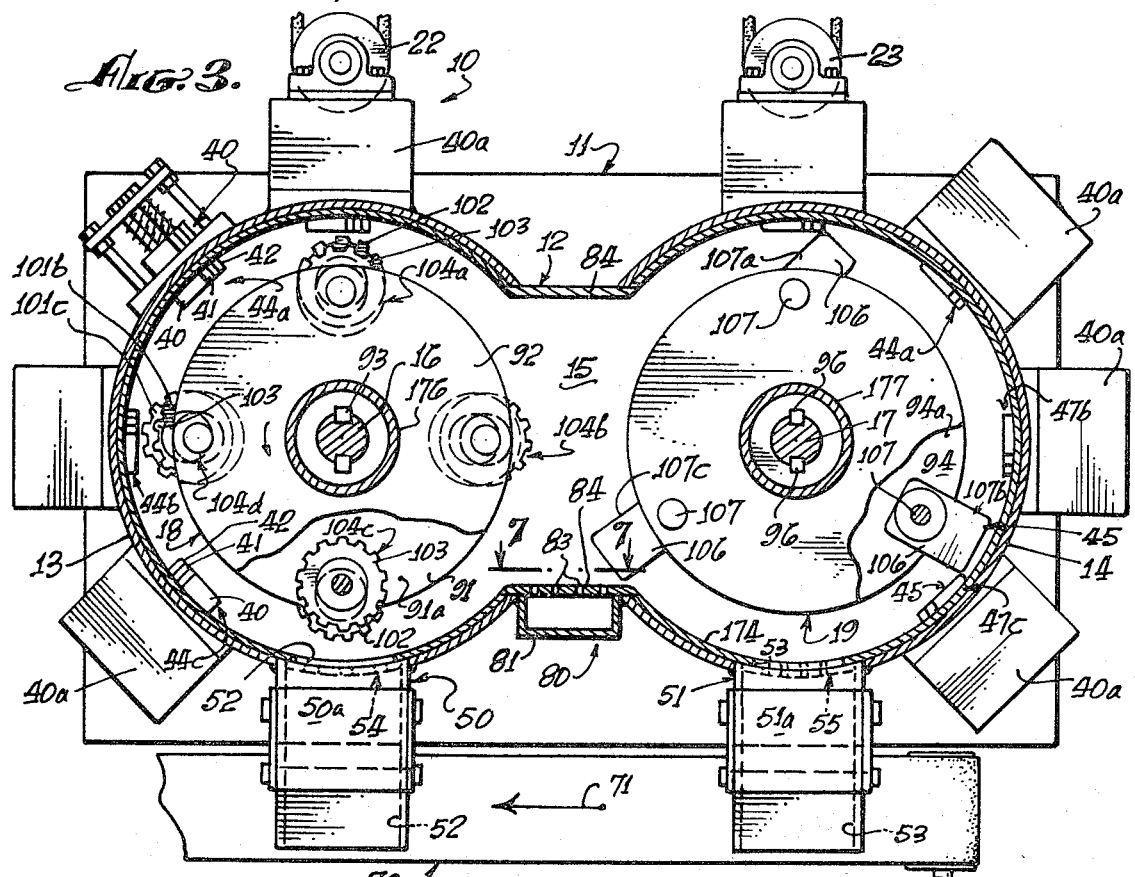

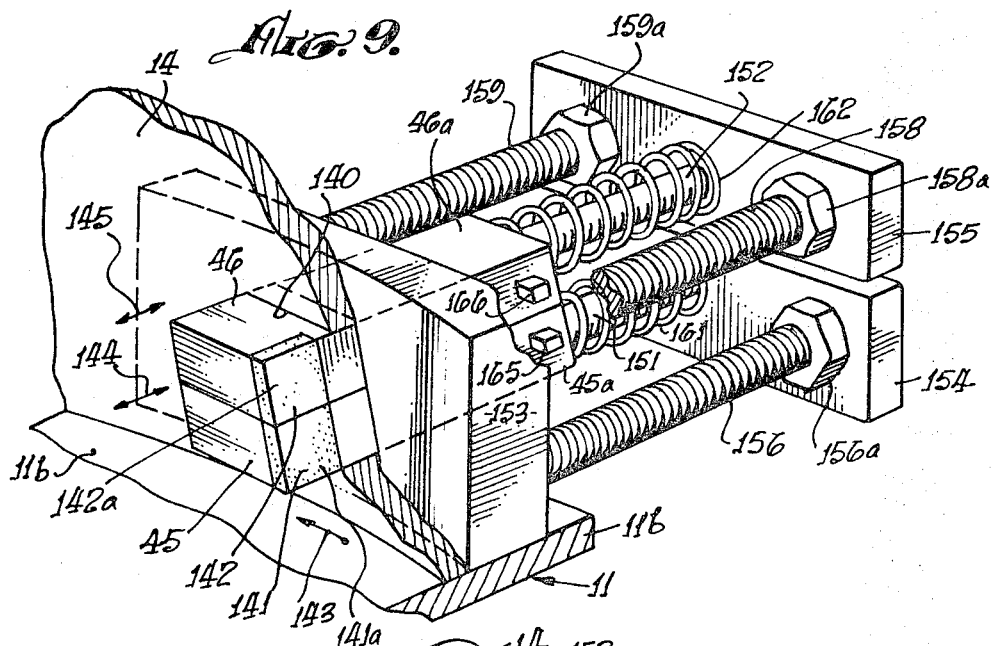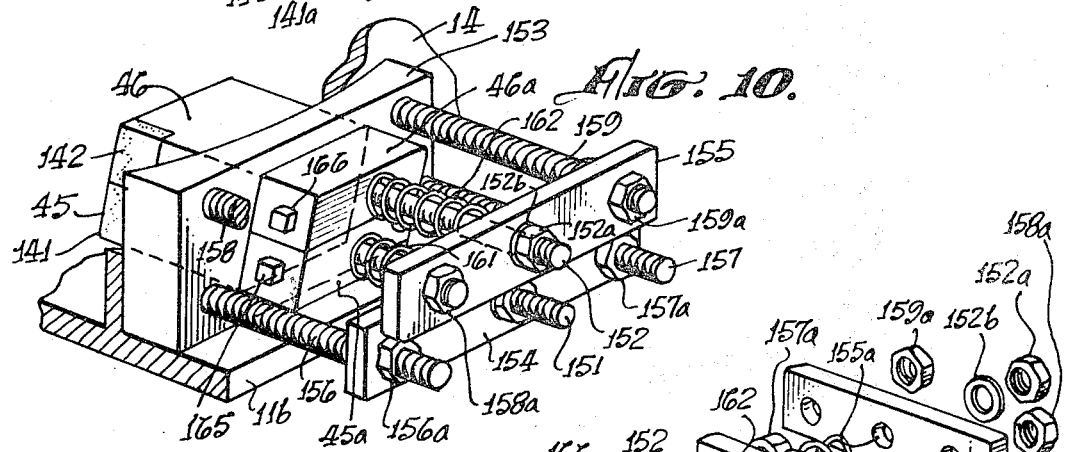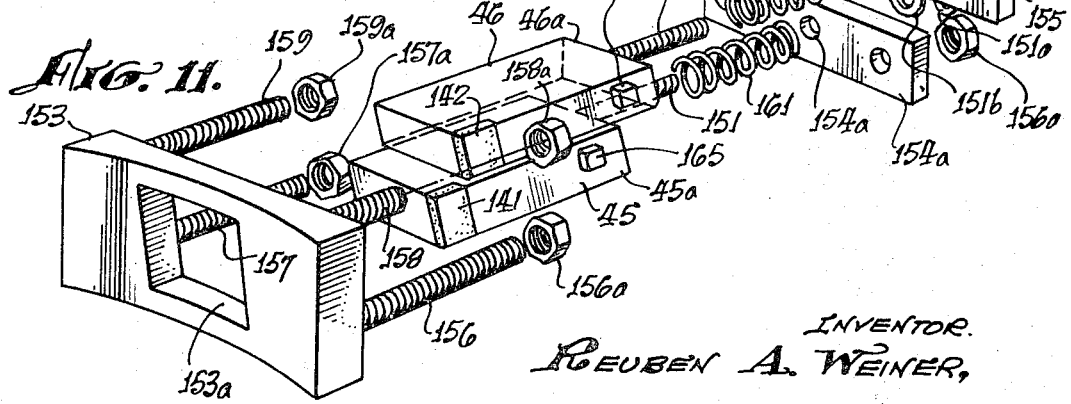

1

3,533,565
HAMMERMILL WITH SIDE-BY-SIDE ROTATING HAMMER SYSTEMS
Reuben A. Weiner, 8200 E. Slauson Ave.,
Pico Rivera, Calif. 90660
Filed Sept. 19, 1968, Ser. No. 760,875
Int. Cl. B02c 13/16, 13/20, 13/284
U.S. Cl. 241—44
10 Claims

ABSTRACT OF THE DISCLOSURE

A hammermill with two vertical rotating hammer systems housed in side-by-side intercommunicating cylindrical housings. Each hammer system is carried between upper and lower flywheels fixedly mounted on a rotatably driven flywheel shaft coaxial with one of said cylindrical housings, and each system comprises several levels of horizontally movable hammers distributed around the circumference of said flywheels. Corresponding with each level of hammers in each of said systems, the sidewalls of the cylindrical housing for the system is provided with inwardly projecting breaker blocks, which are adjustable in clearance with adjacent hammers, and resilient resistance to outward displacement when engaging scrap objects.

---

This invention relates generally to vertical hammermills in which crushing and grinding of metal scrap or the like is accomplished by means of a system of hammers rotated at high speed about a vertical axis inside a confining housing; more particularly, the invention is a vertical hammermill in which two rotating hammer systems share a common housing, each system having several levels of movably mounted hammers which strike scrap objects against corresponding levels of breaker blocks which are resiliently mounted in the sidewalls of the housing.

The present invention is intended primarily for use in the scrap metal industry, and it will be discussed by reference to the conversion of scrap objects into scrap fragments and scrap fines; however, these terms are not intended as restrictions, and the invention may find use where analogous processing problems are encountered.

In the past two decades, the scrap metal industry has been transformed from a byproduct type of industry to an indispensable major source of industrial metal. Complex industrial technology has created a demand for industrial products containing a great diversity of industrial metals in a single item; and this same technology has accelerated obsolescence to the point that the complex product is usually a scrap object within a few years or even a few months.

The dominating and controlling factor in the scrap metal industry, usually overshadowing all other factors, is the cost of converting the scrap object into scrap fragments, which are separated into groups of substantially all one metal, and have a fragment size which is industrially usable in smelting or otherwise. In almost all cases, this separation must be accomplished by physical fragmentation, and physical separation of the fragments; chemical separation is usually not economically feasible for the great tonnages which must be processed.

In recent years, very large and costly plants for processing scrap objects, and separating scrap fragments, have been designed and built. Unfortunately, these large plants introduce a second major economic consideration, namely, the cost of transporting huge tonnages of scrap objects to a central plant of large capacity. A very substantial portion of all scrap objects are distributed geographically over a large area, and it is often uneconomical to ship them to a large central plant for processing. For example,

2 a large quantity of scrap objects may occupy many times the volume of the fragments they would produce, and certain categories of those fragments would preferably be shipped to different destinations.

The present invention is one of the very few modern devices capable of separating scrap objects into scrap fragments, and with the aid of auxiliary known devices, into grouping by specific metal, which also is small enough and inexpensive enough in construction to be economically feasible for relatively small volume locations. Its use is not limited to small volume, and it may be built in larger sizes, or be used in multiple units, but for application to efficient scrap processing of relatively small tonnages, it fills a need which is not met by any known scrap processing machine at present.

Most hammermills of the past were designed for use in the mining industry; with very few exceptions, such hammermills have proven unsatisfactory for processing scrap. A mining hammermill is usually designed for breaking up a particular type of ore, preparatory to subsequent separation of a small percent of granular minerals, most of the ore being rejected as waste, and discarded to a pile of tailings. A hammermill intended for scrap processing must be capable of dealing with scrap objects having a wide variety of component metals, and very different physical characteristics. Rock-like material is not present in any substantial percent; many scrap objects are comprised almost entirely of metals which it would be desirable to recover. Throughout this application, the term "scrap objects" is used as an all-inclusive term to include substantially all those objects which are usually encountered in the scrap metal business. Most scrap objects are manufactured assemblies, or machine parts, which have been discarded because of obsolescene or damage. Parts and subassemblies from automobiles, airplanes, military equipment, and electronic equipment are examples of scrap objects. Many of these contain a wide assortment of very different metals, each valuable as scrap if it can be separated at reasonable cost. For example, a single scrap object may contain several different types of steel, having very different characteristics and value, and a great variety of non-ferrous metals, such as aluminum, copper, brass, zinc, and lead. The separation problem is very often further complicated by the presence of non-metallic materials in substantial quantities; glass, plastics, organic fabrics and materials, and wood parts may be present; some of the non-metallic materials may also be worth recovery as valuable scrap.

A hammermill intended for breaking up scrap objects must be capable of producing scrap fragments of a predetermined size, suitable for further separation, and suitable for the intended use as an industrial raw material. It is common to designate the fragments or particles produced by fragmentation of scrap objects as nuggets and fines; the former may be anything from pea size gravel up to chunks several inches in diameter; the latter may be granules like small gravel, ranging downward in size, usually specified by a mesh number, to powdered material so finely divided that it is usually separated as dust entrained in a moving stream of air. For a specified metal, the smeltering plant to which the scrap metal must be sold, usually has specifications of nugget size; fragments which are less than the minimum required are not practical for use in the particular smelting process; fragments above the maximum specified size are likely to contain too high a percentage of impurities, and so cannot be used in the particular smelting process. On the other hand, a relatively small percentage of scrap fragments are sold to industries in which they will be chemically dissolved; for such purposes, scraps fines of the smallest obtainable size are preferred.

In recent years, a few very large scrap machines, costing hundreds of thousands of dollars, have been developed by large scrap processors, in order to meet the many requirements for different categories of scrap objects, and different specifications required for scrap fragments as raw material. Generally, the small hammermill, which would be economically feasible for a relatively small local scrap yard, has been rejected, or is met with very limited success, because of its lack of versatility, adjustability, and reliability in long runs of continuous operation.

Also, the lack of a suitable hammermill has resulted in high shipping costs for scrap objects and scrap fragments. Shipping costs of heavy scrap material are generally calculated by volume, rather than by weight. Thus, a suitable hammermill could be used at local scrap yards in each geographic area for reducing shipping costs, even if further fragmentation, separation, or other processing were required. Prior to the present invention, hammermills used for processing scrap have generally been unable to achieve long runs, without breakdown, or jamming, except by resort to complex machinery, or by designing the hammermill for a very limited range of scrap object intake, or a very low volume of material processed per hour. Many hammermills of the prior art are able to continue operating only if they do not encounter a scrap object of high structural strength. It is not sufficient to restrict the intake of scrap objects to a predetermined size; in addition, the scrap objects must be selected for their hardness, or compactness, to avoid breaking the hammermill. The internal system of most such hammermills do not provide for adjustment prior to start-up, to accommodate a particular category of scrap objects; and once started, most such hammermills lack any or sufficient provision for yielding of the hammermill parts when an unusually hard scrap object is encountered.

Many hammermills of prior art subject the scrap object only to one or two types of fragmentation blows; it often happens in such hammermills that one or two particular scrap objects cannot be broken by these blows and must simply be ground away as they experience a continuous tumbling action within the hammermill; this greatly reduces the tonnage per hour which can be processed by the hammermill.

All hammermills unavoidably encounter problems of jamming within moving parts because of an accumulation and compaction of granules between moving parts; almost no hammermills heretofore known are characterized by any self-cleaning action.

The hammermill of the present invention overcomes the foregoing and many other objects, and has many new features and advantages; but, at the same time, it has an initial cost and a maintenance cost which are very low in comparison with hammermills which process the same tonnage per hour. The hammermill of the present invention may be built in large sizes and used in multiple units by large scrap processors; however, it is almost alone in the field of hammermills suited for use by local scrap processors who require a machine which can be operated from a single motor of less than 100 horsepower, and which can be operated, adjusted, and repaired by scrap yard employees having no special training for the particular machine.

The hammermill of the present invention is of the rotating flywheel type, in which the stored kinetic energy of the rotating system is drawn on for the shocks of impact with the scrap objects. However, the hammermill of the present invention avoids the accumulation of a few scrap objects which are merely tumbled into the machine, without being fractured.

The hammermill of the present invention can be operated with a wide range of scrap object input for long periods of running time, without breakdown problems. The present invention has a large number of preliminary adjustments which may be made, prior to start-up, and several additional adjustments which can be made even during operation, without shutting down the machine, or if shutdown is required, without opening the machine. The present invention employs movable hammers which strike or grind the scrap object against relatively sharp-edged breaker blocks, a term used herein to designate certain nondriven parts which break, shear, or grind scrap objects and scrap fragments thrown or driven against them by the driven hammer parts. In some hammermills, these parts are referred to as anvils, or stationary blades.

The present hammermill may be classified as a vertical type; like many prior art hammermills, it relies on a system of rotating hammers, carried on a vertical-axis driven shaft. Unlike previously known vertical hammermills, however, the hammermill of the present invention employs two rotating hammer systems which rotate side by side close to one another within the same housing. Moreover, the housing is formed internally to closely accommodate the two vertical-axis rotating systems within two cylindrical chambers or cavities, which are intercommunicating from top to bottom at their adjacent sides. The intercommunicating passage is very short, and, preferably, is very nearly a common chordal plane. In any event, the length of the passage between the two cylindrical chambers should be less than the radius of the chambers. As will be described in detail hereinafter, the scrap objects introduced into the hammermill housing are forced to circulate between the two chambers, and are thus subjected to many different angles of fracture impact. Moreover, adjacent surfaces of the rotating hammer systems pass each other in opposite directions, so that a scrap object falling between the two chambers receives double the impact which it would receive between one of the hammer systems and the adjacent stationary wall surface of the housing, or an adjacent stationary breaker block.

The hammermill of the present invention eliminates most breaking and jamming problems. The two rotating hammer systems, including flywheel, are designed to fragment or grind scrap objects between hammers carried within the rotating systems, and breaker blocks inwardly projecting from the cylindrical sidewalls. However, both breakage of the machine and jamming of its parts are avoided by a coacting combination of movable mounting for the hammers, and resilient movability for the breaker blocks located opposite to the moving hammers. Constant movement during operation of both hammers and breaker blocks introduces a self-cleaning action, which makes jamming extremely unlikely. To a limited degree, the resilient mounting of the breaker blocks may be adjusted without stopping operation of the machine.

Several important changes in adjustment of the hammermill of the invention may be made while the machine is stopped, but without opening it for internal disassembly.

The hammermill of the invention permits the use of different types of hammers, different types of breaker blocks, and even different sizes and different speeds of rotating systems. For processing a particular category of scrap objects, to produce a predetermined output of scrap fragments of predetermined size, the two rotating systems may differ from each other in vertical spacing of its parts, in angle of deflection of breaker blocks, and in the types of hammer used in the two rotating systems or at different elevations in the same system. In addition, the two systems may be run at different speeds.

The invention is disclosed in specific detail in one preferred form of construction described in the following and illustrated in the accompanying drawings, in which:

FIG. 1 is a perspective view of a hammermill constructed according to the invention, as viewed from the upper, left front;

FIG. 2 is a vertical sectional view through the longitudinal center line of the hammermill in FIG. 1, as viewed at the vertical plane indicated in FIG. 1 by the arrows 2—2;

FIG. 3 is a horizontal sectional view at a little above mid-height of the hammermill of FIG. 1, as shown at the horizontal plane indicated by the arrows 3—3 in FIG. 1, but with certain parts fragmentarily broken away to reveal some lower parts which would otherwise be partially concealed;

FIGS. 4 and 5 are perspective and detail views in exploded assembly, of two forms of freely rotatable hammer constructions;

FIG. 6 is a fragmentary perspective view of the back of the hammermill of FIG. 1;

FIG. 7 is a fragmentary vertical sectional view of the middle part of the hammermill of FIG. 1 as viewed at the vertical plane indicated in FIG. 3 by arrows 7—7;

FIGS. 8a, b and c are perspective views of three grates used at the discharge openings of the hammermill of FIG. 1 to restrict discharge to scrap fragments of a predetermined maximum size;

FIGS. 9 and 10 are perspective views of a resiliently mounted and adjustable stack of breaker blocks, with adjacent parts of the hammermill indicated fragmentarily, as viewed from the interior and exterior, respectively, of the hammermill of FIG. 1; and FIG. 11 is a perspective view of an exploded assembly of the breaker blocks and associated mounting parts.

In FIG. 1, the hammermill is indicated generally by the numeral 10. It is of massive steel construction, weighing many tons, and typically, standing 8 to 12 feet tall, from floor to top. Hammermill 10 is so massive, and is subjected to such large forces, that it requires a massive platform base 11, constructed of I-beams 11a and steel plates 11b, in welded assembly.

Crushing and grinding in hammermill 10 is carried out inside of a massively constructed housing designated generally by the numeral 12, but constructed in the form of two vertical cylinders 13 and 14, which have their interiors in open communication at adjacent sides, as indicated generally by passage 15.

Inside of the cylinders of 13 and 14 are a pair of vertical flywheel shafts 16 and 17 (seen in the vertical sectional view of FIG. 2), respectively.

Each of the shafts 16 and 17 carries an associated rotating systems 18 and 19, comprised of flywheels and hammers, as will be described hereinafter. Shafts 16 and 17 are driven by a suitable engine or motor (not shown) through a system of belts and pulleys, comprised principally of the pulleys 20 and 21 on the lower ends of shafts 16 and 17 respectively, and a pair of intermediate or jack pulleys 22 and 23 (see FIG. 6) mounted on the back of platform base 11.

An input conveyor 30 conveys scrap objects up an incline from the ground, and dumps them, as indicated by the arrow 31, into a receiving chute 32. In the illustrated embodiment, chute 32 is centrally located at the back of the hammermill 10 and delivers the scrap objects to the interior of cylinders 12 and 13 through a central opening indicated in FIG. 2 and by the numeral 33. However, it will be understood that alternative receiving chute structures might be employed, such as separate receiving chutes for cylinders 12 and 13, or the employment of one or more receiving chutes, entering the cylinders at obliquely tangential angles. Experimentation with different types of scrap sometimes establishes that it is better to deliver scrap objects into the cylinder 13 for first contact with grinder rings 18; whereas in other cases, it will be found best to deliver the scrap into cylinder 14 for first contact with swinging hammers 19.

It will be understood that shafts 16 and 17, and their associated systems 18 and 19 are rotating inside cylinders 13 and 14 at very high speed, at 1000 revolutions per minute, for example. Scrap objects are subjected to a hammering and grinding operation which reduces them to nuggets and fines. It is an important point of novelty of the present invention that the rotating systems 18 and 19 cooperate with sets of resiliently mounted breaker blocks, identified generally by the numeral 40, which are mounted in the sidewalls of cylinders 13 and 14. Other stationary breaker blocks 41 are also provided.

Nuggets and fines produced by the hammermill 10 are discharged from the lower ends of the cylinders 16 and 17 (or from just one of them) through discharge chutes 50 and 51 and are carried away by a conveyor 70 in the direction of the arrow 71.

In the preferred form shown, a dust collection system indicated generally by the numeral 80 and comprised principally of a vertically rising dust-removal duct 81, and any suitable dust separator 82. It will be found that the operation of hammermill 10 on reasonably clean scrap objects does not generate a very large amount of dust. Nevertheless, the dust removal system 80 is illustrated to show one preferred manner of providing dust removal where it seems to be called for, or where it is required by local law. Also, the dust-removal system 80 may be used to separate a fines product of small size or low density produced by grinding action within hammermill 10 in some cases.

The two rotating systems 18 and 19, and the coacting internal construction of cylinders 13 and 14 are best described by reference to the vertical and horizontal sectional views of FIGS. 2 and 3, respectively. Shafts 16 and 17 are seen to be journalled in massive upper and lower ball bearings 16a, 16b, 17a and 17b. Each of the two shafts, 16 and 17, carries a pair of vertically spaced flywheels near its lower end. On shaft 16, a lower flywheel 91 has its upper surface 91a in substantially the same plane as the upper surface of the base platform 11. An upper flywheel 92, on shaft 16 is spaced upwardly from the surface 91a a sufficient distance to accommodate three levels of hammers, 101, 102, and 103, stacked one above the other, and retained in position by vertical hammer shafts 104, as will be described in detail hereinafter. However, it will be further noted that there is sufficient empty space within cylinder 13 above upper flywheel 92 to permit scrap objects and scrap fragments to be freely thrown about within the entire interior of housing 12. Flywheels 91 and 92 are keyed by keys 93 to shaft 16, so as to rotate with it when it is driven through pulley 20, as already mentioned.

Shaft 17 is likewise provided with lower flywheel 94, and upper flywheel 95, both keyed to shaft 17 by keys 96, but, in this case, flywheel 95 is at a lower elevation than flywheel 92. Like lower flywheel 91, lower flywheel 94 has its upper surface 94a substantially coplanar with the upper surface of the base platform 11. Between lower flywheel 94 and upper flywheel 95 the hammers are stacked at only two levels, rather than three, as indicated for hammers 105 and 106. Moreover, as will be described hereinafter, in the illustrated example, the hammers 105 and 106 have a construction and operation very different from hammers 101, 102 and 103. Hammers 105 and 106 are rotatably mounted on vertical hammer shafts 107.

As seen from the horizontal sectional view of FIG. 3, the hammers 101 to 103 and 105 and 106 are carried in several stacks along the periphery of their respective rotating systems 18 and 19. Flywheels 91 and 92 carry four hammer systems, 104a, 104b, 104c, and 104d; flywheels 94 and 95 carry three hammer stacks, 107a, 107b, and 107c.

In the present invention, the term "hammer" is used to include all the possible hammer-like devices which might be employed in the hammermill 10 for making some kind of contact with scrap objects or scrap fragments, regardless of whether the types of contact might be shearing, grinding, compressing, or other type of contact. Whatever the type of hammer, it would be of ring-like construction, and carried on shaft 104 or 107, being freely rotatable thereon, in a horizontal plane and about a vertical axis. Hammers 101, 102, and 103, which are identical, are seen in perspective in FIG. 4; hammers 105 and 106 are likewise identical and are illustrated in the perspective view of FIG. 5. These two types of hammers are preferred typical constructions, which are entirely different from each other in their operative action on scrap fragments.

The exploded assembly view of FIG. 4 reveals that hammer shaft 104 is a large bolt which is threaded at its lower end to receive a nut 110, which seats against a washer 111. Preferably, the hammershafft 104 is protected by a sleeve 112, and a cover plate 113. As seen in the sectional view of FIG. 2, the head of bolt 104 is received into a recess 113a, which recess is covered by cover plate 113, the latter being welded in position.

Hammers 101 to 103 have the shape and appearance of square toothed gears. Their central bore (101a in FIG. 4) is typically about twice the diameter of the external diameter of sleeve 112, so that the hammers 101 to 103 not only rotate freely on hammer shaft 104 and sleeve 112, but are also freely movable in a radial direction with respect to the flywheel shafts 16 and flywheels 91 and 92, between an inner position 101b and an outer position 101c seen in plan view in FIG. 3. Thus, when hammermill 10 is in operation, and the flywheel and hammer system 18 is rotating at a typical speed of 1000 revolutions per minute, the hammer rings 101 to 103 will occupy an outer position 101c under the influence of centrifugal force until a scrap fragment is engaged.

When hammer rings 101 to 103 engage scrap fragments between their teeth and horizontally adjacent breaker blocks 40, the hammer rings tend to yield radially inward, while rotating against the scrap fragment, and impelling it at high speed against the adjacent edges of breaker blocks 40. As will be explained hereinafter, the breaker blocks 40 are resiliently mounted so that they can move outwardly, with resiliently yielding resistance, when the impact of a scrap fragment exceeds some predetermined maximum.

FIG. 5 shows the second illustrated preferred form of hammer, hammers 105 and 106. Three hammer shafts 107 are mounted between flywheels 94 and 95 at their periphery, as illustrated in the plan view of FIG. 3. Each hammer shaft 107 is assembled with the same type of parts, similarly numbered with an "a" suffix, as those employed with hammer shaft 104.

Hammers 105 and 106 are, in effect, horizontally swinging pendulums. Hammershaft 107, and its protective sleeve 112a are closely received in a vertical bore 105a, which is located eccentrically with respect to both volume and mass of hammer 105 (hammer 106 being identical in construction and operation). Each of the hammers 105 and 106 thus depend on swinging rather than loose fit at the bore 105a, for yielding under impact with a scrap fragment. Typical positions for the pendulum-like hammers 105 and 106 are seen in the plan view of FIG. 3.

It will be understood that the invention is not restricted to the two types of freely rotating hammers illustrated in FIGS. 4 and 5. Many other constructions, both simpler and more complex, may be devised by those skilled in operation of hammermill 10, for processing particular types of scrap.

Resiliently mounted breaker blocks 40 provide the most important features of adjustability, self-cleaning action, and variety of scrap-fracturing impact, which make the double-cylinder construction of hammermill 10 outstanding in long period operating runs without breakdown, maintenance of a high tonnage of scrap processed per hour through the long run, and selective adjustments for processing different types of scrap. Moreover, it is the adjustability of resilient resistance, and clearance from the hammers of rotating hammer systems 18 and 19, which enable the operator to make certain of efficient and continuous circulation of scrap objects and scrap fragments back and forth between the two side-by-side cylindrical chambers 13 and 14.

In the preferred form illustrated, hammers 101 to 103 are rotated within chamber 13 in a set of four stacks, 104a to 104d, each of which is three hammers high (hammers 101, 102, and 103 being stacked one above the other on each of the hammer shafts 104). Correspondingly, the resilient breaker blocks 40 associated with cylindrical chamber 13 are stacked three high as indicated by blocks 41, 42, and 43 in FIG. 2. The plan view of FIG. 3 shows that there are three sets of stacks, 44a, 44b, and 44c, which project radially inward from the interior wall surfaces of chamber 13. Similarly, chamber 14 is provided with two levels of breaker blocks 45 and 46 arranged in three inwardly projecting stacks 47a, 47b, and 47c.

Externally of hammermill 10, the working parts of resilient hammer blocks 40 are concealed within removable, rectangular, box housings 40a, except that housing 40a has been removed from the exterior parts of stack 44a, in FIG. 3, to reveal the internal mechanism in plan view.

The detailed construction of the resiliently mounted breaker blocks 40 is illustrated in the enlarged perspective detail FIGS. 9, 10, and 11, which show a two-high stack such as stack 47a. However, it will be understood that each stack of hammers, of whatever type, and each stack of corresponding breaker blocks 40, might have more than two elements one above the other, for example, three high as in the case of breaker blocks 44a, 44b, and 44c. Also, the invention in a more primitive form might be reduced to simply a single hammer on each hammer shaft, and correspondingly, only one level of resiliently mounted breaker blocks 40.

In FIG. 9, the cylindrical side wall of cylindrical chamber 14 is indicated fragmentarily, as seen from the interior of cylinder 14. Also, the upper surface of base platform plate 11b is seen fragmentarily. Projecting inwardly into the interior of cylinder 14, are seen the inner ends of resiliently mounted breaker blocks 45 and 46. Breaker blocks 45 and 46 are seen to be radially slidable in an opening 140 in the side wall 14, their outer ends 45a and 46a being seen projecting externally of cylindrical housing 14.

Although the breaker blocks of breaker block system 40 might be in the form of rectangular parallelepipeds, it is much preferred that they be constructed with rhomboid or rhombus cross section, and that opening 140 be cooperatively shaped so that breaking faces 141 and 142 of breaker blocks 45 and 46. respectively, present an upwardly inclined plane to the rotating hammer systems 18 and 19, as well as to the scrap objects and scrap fragments impelled by said systems, in the direction of the arrow 143. Preferably, the inclined, impact surfaces 141 and 142 are provided with hardened inserts 141a and 142a, which greatly prolong their useful life.

As already mentioned, the breaker blocks 45 and 46 are radially reciprocable in opening 140, entirely independently of each other, this radial movement being indicated by the double-ended arrows 144 and 145.

The external structure of the resilient breaker block system 40 is illustrated in FIG. 10. It may be seen from FIG. 10, and also from the individual parts seen in the exploded assembly of FIG. 11, that each of the breaker blocks 45 and 46 is provided at its outer, or back, end, 45a and 46a, respectively, with a coaxial bolt, identified by the numerals 151 and 152. Bolts 151 and 152 may be designated "sliding bolts" since they move integrally with the longitudinal movement of the breaker block to which they are welded.

The breaker blocks 45 and 46, together with their respective sliding bolts 151 and 152, are under continuous reciprocating, radial, sliding movement, within opening 140, and also within coaxial openings, 153a, 154a and 155a, which are provided in a front guide frame 153, and back guide frames 154 and 155. Front guide frame 153 is a massive steel piece which is welded to the outer surface of cylindrical housing 14. Its opening 153a is of rhomboidal shape to accommodate the breaker block stack comprised of breaker blocks 45 and 46 in a single opening.

At the back, or outer ends, of the breaker block system, the sliding bolts 151 and 152 slide within separate back guide frames 154 and 155, respectively.

In the specific preferred form illustrated, back guide frames 154 and 155 are steel plates, each disposed in a vertical plane, and horizontally extended transverse to the the sliding bolts 151 and 152. Back guide frame 154 is supported at a preset, but adjustable, radial distance back of front guide frame 153 by a pair of support bolts 156 and 157, being held in position by threadably received nuts 156a and 157a. Similarly, back guide frame 155 is supported by support bolts 158 and 159, and corresponding nuts 158a and 159a.

The sliding bolts 151 and 152 are encircled by coaxial coil springs 161 and 162, respectively. Coil springs 161 and 162 are compressed between the back ends 45a and 46a, respectively, and the corresponding back guide frames 154 and 155, respectively, which are held in position by nuts and washers, 151a and 151b for sliding bolts 151, and 152a and 152b for sliding bolt 152. The springs 161 and 162 are very powerful, and have a stiff resilience resisting outward displacement of their respective breaker blocks, except under high impact with a scrap object or scrap fragment. By means well known to those skilled in the fabrication of coil springs, coil springs 161 and 162 may be constructed to have a rising degree of stiffness as they are compressed, so that the degree of resilient resistance of springs 161 and 162 can be adjusted by adjustment of sliding bolt nuts 151a and 152a.

It is essential to the effective and safe operation of hammermill 10 that there be maintained a proper, predetermined clearance between the inner ends of resiliently mounted breaker blocks 40, and the hammers of rotating hammer systems 18 and 19. For some applications, it will be desired that such clearance be positive, i.e., that no impact or contact whatever can occur between the hammers contained within the rotating systems 18 or 19. In other applications, there may be a limited negative clearance; for example, as seen in FIG. 3, the pendulum type hammers 105 and 106 may actually impact on the adjacent surfaces of breaker blocks 45 and 46; it will be noted, however, that hammers 105 and 106 have a large positive clearance from the breaker blocks 45 and 46 when the hammers swing to a retracted position.

In the preferred construction illustrated in the drawings, the clearance is conveniently adjustable by adjusting the position of back guide frames 154 and 155 on their respective support bolts (156 to 159 inclusive). Indeed, this adjustment of clearance can be carried out while hammermill 10 is operating. Of course, it will also be noted that clearance is affected by the positions of the sliding bolt nuts 151a and 152a, and the degree of compression of coil springs 161 and 162.

As a safety precaution against reduction of clearance below a safe minimum clearance point, the breaker blocks 45 and 46 are provided with minimum clearance stops 165 and 166, respectively. Stops 165 and 166 are in the form of laterally projecting steel blocks welded to the sides of the outer ends of 45a and 46a, so that the breaker blocks 45 and 46 can be moved inwardly through front guide frame 153 only up to the point at which stops 165 and 166 come into contact with the outer surface of front guide frame 153.

A number of inwardly projecting stationary breaker blocks 49 are disposed around the inner periphery of the upper part of cylindrical housings 13 and 14, as seen in FIG. 2. Preferably, the impact face 49a of each stationary breaker block 49 is downwardly declining, so that scrap objects or scrap fragments thrown against stationary breaker blocks 49 by the rotating systems 18 and 19 tend to be deflected downwardly toward the upper surfaces of the upper flywheels 92 and 95.

The hammermill 10 relies for its effective operation on certain essential features of its interior wall surfaces, and also the relative sizes of rotating systems 18 and 19, the empty space above them, and the size of scrap objects to be introduced into hammermill 10. The vertical cross-sectional view of FIG. 2 reveals that the volume of empty space in the upper interior of cylindrical housings 13 and 14, as well as their intercommunicating passage 15, are much larger than the valume of all the solid objects, moving or otherwise, contained within those cavities. This substantial volume of empty space is required in order to produce rapid and continuous circulation of flying scrap objects and scrap fragments back and forth between the cylindrical chambers 13 and 14, and also to permit the tumbling of a large scrap object until it has been broken into fragments sufficiently small to be received in the smaller spaces in the lower parts of chambers 13 and 14, there to be broken into still smaller fragments. Preferably, the empty upper space within the various parts of the housing 12 is substantially larger than the volume of solid objects contained therein; but a safe minimum below which the empty space cannot be reduced is determined by the maximum size of scrap object which it is desired to introduce into the hammermill 10. The scrap objects must not be jammed into an immovable position immediately upon entering hammermill 10; on the contrary, scrap objects must be introduced into the interior of hammermill 10 at a size and at a rate such that they can be freely moved about within the hammermill for the few seconds which may elapse until they are fragmented. One factor related to this, of course, will be the rate at which fragments can be withdrawn from hammermill 10, and this will be determined to some degree by the size of nuggets and fines desired, as well as the characteristics of the scrap objects.

It is important that the passage 15 be so short that it is almost a common chordal plane of the two vertical cylindrical housings 13 and 14. The vertical dimension of passage 15 should extend from the upper surface of the base platform 11 to a height sufficient to permit free circulation of flying scrap fragments to pass through passage 15. This height will be referred to herein as "substantially the entire vertical height of said cavities," although it will be appreciated that this refers to the height of cavities 13 and 14 which play any role in circulation between the two cylinders; additional height of housings 13 and 14 not required for such circulation is not included as effective vertical height. Preferably, the two generating circles of the cylinders 13 and 14 should almost touch, so that the effective length of passage 15 between cylindrical cavities 13 and 14 would be very nearly zero at the line between the axes of flywheel shafts 16 and 17. However, for some purposes, the length of passage 15 might be increased as long as substantial circulation between the two cylindrical cavities 13 and 14 can continue to be achieved. In any event, if such a spacing between the generating circles of the two cavities became as much as or greater than the radius of the smaller of the two cavities (assuming one cavity might have a smaller radius than the other) then fragments would not freely circulate between cylindrical cavities 13 and 14. The horizontal transverse dimensions of passage 15 must be less than the diameter of either of the two cylindrical cavities 13 and 14 in order to provide internal cylindrical surfaces which converge toward passage 15 and tend to deflect flying scrap fragments into the rotating systems of the opposite cavity, and particularly in a way in which the flying scrap fragments will then be circulated through the opposite cavity, rather than being returned to the same cavity from which it had just been thrown.

The hammermill 10 is intended to withstand severe usage and hard wear. A preferred feature of its construction is the provision of protective armor plate lining, or replaceable sheaths at points which have been found to be vulnerable to wear. The protective sleeves 112 and 112a used on hammer shafts 104 and 107 have already been mentioned. Also, the hard facing insert 142a used on the inclined plane impact surfaces 142 of resiliently mounted breaker blocks 45 and 46 has been illustrated and described in connection with FIG. 9. The sectional views of FIGS. 2 and 3 reveal that cylindrical housings 13 and 14 are provided with protective cylindrical interior wall linings 173 and 174, respectively.

The vertical and horizontal sectional views of FIGS. 2 and 3 also reveal that the upper parts of flywheel shafts 16 and 17 are protected by cylindrical housings 176 and 177.

Receiving chute 32 must be so constructed as to minimize or eliminate danger from scrap fragments flying about within hammermill 10. There is always a danger that some of the many scrap fragments may be impelled with sufficient energy to be thrown, by elastic collisions with wall surfaces, through the entrance opening 32a. In the preferred construction illustrated, the input conveyor 30 approaches chute 32 at right angles, and input opening 32a is located at a stepped up elevation. In addition, it has been found desirable to attach a flap 32c of heavy rubber belting to the interior of opening 32a, so that it hingably deflects inwardly only. It is a preferred construction for receiving chute 32 that it introduce scrap objects into the central part of housing 12, namely, at the middle of intercommunicating passage 15. Incoming scrap objects thus fall into the largest open space which is within the housing 12, and immediately contact the moving parts which give the hammermill's maximum fracturing impact, namely, contact between adjacent parts of rotating systems 18 and 19 moving in opposite directions. Also, scrap objects which enter passage 15 from overhead receiving chute 32 fall on the rapid surfaces of flywheels 92 and 95 at two different elevations, so as to reduce the probability that a scrap object will find a location of repetitive tumbling, without circulation.

Dust and metallic fines are continuously removed from the interior of housing 12, in the preferred form of hammermill 10 shown in the drawings, by the continuous withdrawal of a large volume of air through dust removal duct 81, upwardly through a dust separator and blower system indicated only symbolically by the housing 82. As seen in the horizontal sectional view of FIG. 3, and the partially broken away elevational detail of FIG. 7, the stream of air, with small particles of dirt and metal entrained in it, is withdrawn through fine openings 83 in one of the vertical sidewalls 84 of passage 15. The air and entrained particles move upwardly in the direction indicated by the arrow 85 to the separating system 82. Scrap fragment products, reduced to a predetermined maximum desired nugget size, leave the housing 12 through discharge openings 52 and 53, by way of discharge chutes 50 and 51. The openings 52 and 53 are fitted with grates such as the grates 54 and 55 illustrated in FIGS. 8b and 8c. Or, alternatively, one of the openings 52 or 53 may be entirely closed by a closely fitted door 56 illustrated in FIG. 8a. Each of the grates 54 and 55, and the door 56 has a concave inner surface, conforming to the interior wall surface of the cylinders 13 and 14. Each is provided with a bolt flange such as bolt flange 55a on grate 55 so that it may be bolted in position from the exterior of one of the cylinders 13 or 14. Access to the interior of discharge chutes 50 and 51, for purposes of changing grates, cleaning, and the like, is had by means of removable covers 50a and 51a seen in FIG. 1.

It is also desirable to provide housing 12 with an upper inspection and access opening 180, covered by a bolted down cover 181. It will be seen from the foregoing description of one specific embodiment, which incorporates many preferred features not absolutely essential to the practice of the invention, that I have provided a new type of hammermill in which coaction between two side-by-side, and intercommunicating, hammermills, together with resiliently movable breaker blocks, produces a variety of fragmentation impact, and a degree of circulation of scrap fragments into different positions, not heretofore found in small or medium hammermills.

Moreover, in the preferred form illustrated, the use of vertical stacks of several different hammers, and several different breaker blocks, one above the other, together with upwardly inclined surfaces on the resiliently mounted breaker blocks 40 near the bottom of the hammermill interior, and the downwardly deflecting stationary breaker blocks 49 in the upper interior of hammermill 10, a great variety of fragmentation impacts and a great speed of high volume circulation of scrap fragments is achieved.

While I have described the invention as constructed in one of its more elaborate and preferred constructions, it will be understood that the hammermill of the invention could be much simplified, or could be made more complex and substantially modified by introduction of many other types of hammer and breaker block, or variations within the range described of the relative dimensions of interior wall surfaces and spatial relationships, and it is my intention to comprehend all of these simplications, improvements or modifications to the extent that they fall within the scope of the attached claims. Engineering equivalents may be substituted; for example, many will prefer tapered roller bearings for bearings 16a, 16b, 17a, and 17b.

I claim:
1. A hammermill for breaking scrap objects of a predetermined maximum size into scrap fragments of a predetermined maximum size, which hammermill includes:
   a base platform;
   a housing on said base, said housing having interior walls defining first and second vertical cylindrical cavities in open communication with each other at their adjacent sides, and connected by walls defining a closed passage, said passage extending substantially the entire vertical height of said cavities, and having a horizontal transverse dimension substantially less than the diameter of either of said cavities and a length between said first and second cylindrical cavities less than the radius of said cavities;
   first and second flywheel shafts rotatably mounted in said first and second cavities respectively, and coaxial with its respective cavity;
   driving means for rotating said flywheel shafts;
   first and second pairs of flywheels fixedly mounted to said first and second flywheel shafts respectively, each of said pairs comprising a lower flywheel at substantially the same elevation as said base platform, and an upper flywheel spaced upwardly from said lower flywheel at an elevation sufficiently below the upper wall of the cylindrical cavity in which it is contained to freely accommodate a scrap object of said predetermined maximum size within said cavity above said upper flywheel;
   first and second hammer systems mounted between said first and second flywheel pairs respectively, each said hammer system comprising; a plurality of vertical hammer shafts mounted between the upper and lower flywheel of a pair, spaced around the circumference of said pair, and at least one hammer rotatably mounted on each of said hammer shafts;
   first and second sets of breaker blocks mounted in the sidewalls of said first and second cylindrical cavities respectively, each set comprising a plurality of inwardly projecting breaker blocks, at least one of said blocks being at the same elevation as the plane of rotation of the hammer system in its cavity, said block being retained at a predetermined horizontal clearance from said hammer system by resilient holding means adapted to yield elastically to permit the outward displacement of said breaker block from said cavity by the momentum of impinging scrap fragements during the operation of said hammermill;
   an input hopper means communicating with the upper interior of said housing for feeding scrap objects into said hammermill;

a discharge conduit means communicating with the lower interior of said housing; and grate means at the entrance of said discharge conduit means for restricting discharge of scrap fragments from said hammermill to those of a predetermined maximum size.

2. A hammermill as described in claim 1 in which at least one of said hammer systems consists of at least two levels of hammers, each of said hammer shafts carrying at least two hammers, one above the other on said shaft, one for each of said levels; and each level of hammers is matched by a corresponding level of breaker blocks inwardly projecting from the walls of the cylindrical housing, each level of breaker blocks being at substantially the same elevation at its corresponding level of hammers.

3. A hammermill as described in claim 2 in which the breaker blocks comprising said several levels of breaker blocks corresponding to said several levels of hammers are independently adjustable in radial clearance distance from the hammers of the corresponding level, and are also independently adjustable in the stiffness of elastic resistance to outward displacement.

4. A hammermill as described in claim 2 in which the breaker blocks disposed at levels corresponding to said several levels of hammers are grouped in stacks around the internal circumference of the cylindrical cavity, one block above the other in each stack, to the same number as the number of levels of said hammers, and the blocks of each stack having their surfaces which face toward the oncoming hammers transported by the rotation of said flywheels formed to present a substantially plane surface which is upwardly inclined with respect to the direction of horizontal movement of said oncoming hammers.

5. A hammermill as described in claim 4, in which are provided breaker blocks mounted in the walls of said cavity containing several levels of hammers, at an elevation above said upper flywheel therein, and said breaker blocks are formed with substantially plain surfaces which face in the direction from which said hammers are oncoming, and which are downwardly declining with respect to the direction of movement of said oncoming hammers.

6. A hammermill as described in claim 2 in which the upper flywheel in one of said cavities is at a lower elevation, and has fewer levels of hammers than in the other of said cavities.

7. A hammermill as described in claim 1 in which said hopper means discharges incoming scrap objects into the upper interior of said intercommunicating passage; and said hammermill is provided with a separate discharge conduit means and grate for each of said cylindrical cavities, each of said discharge conduit means having its entrance at an elevation near said lower flywheel, and not extending above said upper flywheel, and spaced horizontally on said sidewalls away from said intercommunicating passage and into which said scrap objects are discharged.

8. A hammermill as described in claim 1 in which at least one of said hammers is in the form of a ring having an internal diameter substantially greater than the external diameter of the hammer shaft upon which it is rotatably mounted, to permit said ring to be displaced radially inward against centrifugal force, in the event of collision with scrap fragments.

9. A hammermill as described in claim 1 in which at least one of said hammers is eccentric in weight and dimensions with respect to the axis of the hammer shaft upon which it is mounted, and is adapted to swing as a pendulum in a horizontal plane about the axis of its hammer shaft, upon impingement of scrap fragments.

10. A hammermill as described in claim 1 which includes a fines discharge conduit means for withdrawing scrap fragment fines from said hammermill is disposed along at least part of the periphery of said innercommunicating passage, and is in communication with the interior said passage through a wall having a plurality of small openings which restrict discharge through said fines discharge conduit means to a predetermined size of particle; and means for moving a current of air from the interior of said passage through said openings, and through said fines discharge conduit means, for entraining said fines and transporting them from said hammermill.

References Cited
UNITED STATES PATENTS

| | | | |
|---|---|---|---|
| 1,798,465 | 3/1931 | Grindle | 241—188 X |
| 2,774,543 | 12/1956 | Keller | 241—138 X |
| 3,226,045 | 12/1965 | Shelton | 241—188 |

ROBERT C. RIORDON, Primary Examiner

D. G. KELLY, Assistant Examiner

U.S. Cl. X.R.

241—49, 290